(No Model.)
J. C. HOLLOWAY, Sr.
HUB.
No. 347,427. Patented Aug. 17, 1886.
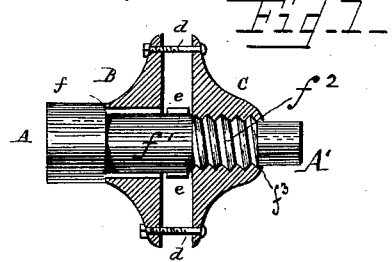
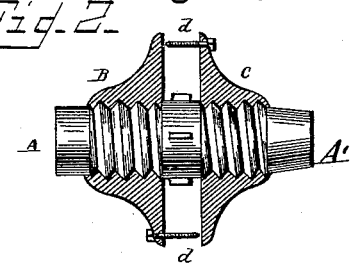
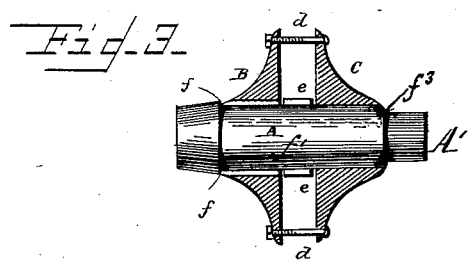
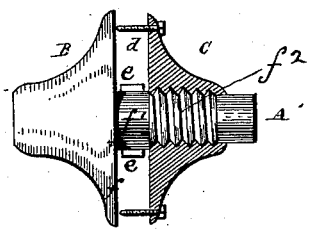
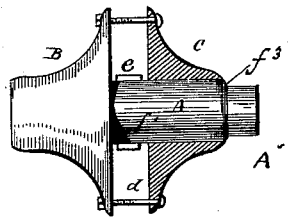
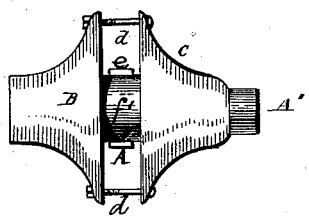
WITNESSES
Edwin L. Yewell,
R. Evans
INVENTOR
J. C. Holloway Sr.
By Frank Meehy
his Attorney

UNITED STATES PATENT OFFICE.

JOSEPH C. HOLLOWAY, SR., OF EDDYVILLE, KENTUCKY.

HUB.

SPECIFICATION forming part of Letters Patent No. 347,427, dated August 17, 1886.

Application filed October 29, 1885. Serial No. 181,245. (No model.)

*To all whom it may concern:*

Be it known that I, JOSEPH C. HOLLOWAY, Sr., a citizen of the United States, residing at Eddyville, in the county of Lyon and State of Kentucky, have invented certain new and useful Improvements in Hubs; and I do hereby declare the following to be a full, clear, and exact description of the invention, such as will enable others skilled in the art to which it appertains to make and use the same.

This invention has relation to hubs for vehicles and the like, and is designed as an improvement upon the invention for which I have made application for Letters Patent, dated September 26, 1885, Serial No. 178,215.

In the annexed drawings, to which similar letters of reference are made indicating corresponding parts in the several views, Figures 1, 2, and 3 represent the axle-box in side elevation, with the collars in transverse vertical section thereon. Figs. 4 and 5 are similar views showing but one collar in section; and Fig. 6 is a side view of the hub complete.

Referring by letter to the accompanying drawings, A indicates the box or hollow tube that fits on the spindle or axle. This box is screw-threaded at $f^2$, and has in its center portion on opposite sides two radial tongues or projections, $e$, to prevent the spokes from turning on the hub, and hold the collar B to its place when adjusted.

B is a collar with grooves in eye, so as to pass over the tongues $e$, and rests against shoulder $f$, and when slightly turned the tongues hold it securely.

C is a collar having an internal screw-thread that screws on thread $f^2$, as shown, and when bolts or rivets $d$ are inserted the hub is complete.

It will be observed from the above description that the exterior of my box A is cylindrical throughout; also, by reference to the several figures, that I provide an extension, A', beyond the box proper, but formed integral therewith, which is specially adapted for receiving sand-caps. This feature I consider a valuable part of my said improvement.

In Fig. 2 is represented a hub, with box A screw-threaded, as shown, on each side of spoke-seat $f'$, or where the ends of spokes rest against the same in center. B and C are collars, also screw-threaded, so as to screw on from each end of the box in opposite directions, so that when screwed up against the spokes and the screws D inserted from each side the collars are prevented from coming loose, and the hub is complete.

In Fig. 4 is represented a hub with box or tube A and collar B formed solid or integrally, with box A screw-threaded, as shown, to receive collar C, which, when screwed on and bolts $d$ screwed in, completes the hub.

In Fig. 5 is represented a hub with box A and collar B formed integrally. C is a collar that slips on from outer end, and with bolts or rivets $d$ inserted in the collars to hold them in place.

In Fig. 3 is represented a hub with box or tube A, having two diametrically-arranged splines or longitudinal ribs, to prevent the spokes from turning in their seats. B is a collar that slips on from outer end of said tube, and has two slots, so as to pass over the splines in center and rest against shoulder $f$, as shown. This collar C is slipped on from outer end and bolts or rivets $d$ adjusted, which completes the hub.

These hubs are so constructed as to be fitted with spokes three different ways, as set forth in the application above referred to.

It will be observed by reference to the annexed drawings that the inner faces of the two collars B C are plain—that is to say, there are no projections or protuberant spoke-bearings crossing the space between the inner faces of said collars, and that the spokes are firmly held near the circumferential edges of said collars by means of the bolts or rivets $d$, thereby dispensing with the transverse portions usually formed integral with the facets of said collars. It will also be observed that by my improvement the said collars are held firmly on the tubular hub against endwise or rotary displacement without the aid of any other device.

I am well aware that hubs have been constructed with screw-tapped collars applied on screw-threaded boxes. I am also aware that said boxes have been provided with end seats or bearings for the spokes, and that bolts have been applied for bracing the spokes outside of their seats on the boxes. In this application I broadly disclaim these devices, separately considered, I am aware that it is not new to construct an outer screw-threaded collar with an extension beyond the screw-threaded end of the hub-box, said extension being closed at its end, so as to entirely inclose a nut when screwed on the axle, and thus serve as a "sand-band;" but in such case it is necessary to remove the band and unlimber the spokes in order to obtain access to the said nut. I therefore disclaim such device.

Having described this invention, what I claim is—

The combination of the reduced extension A' and shoulder $f^3$, formed on the outer part of the hub-box and integral therewith, the spoke-seats, the removable collars, one of which is adapted to pass over the spoke-seats and engage a shoulder on the inner end of the said box, and the bolts $d$, adapted to pass through the spokes and connect the said collars, all substantially as described.

In testimony whereof I affix my signature in presence of two witnesses.

JOSEPH C. HOLLOWAY, SR.

Witnesses:
F. W. DARBY,
W. T. SMITH.